United States Patent
Ahn

(10) Patent No.: US 9,361,239 B2
(45) Date of Patent: Jun. 7, 2016

(54) SYSTEM ON CHIP INCLUDING UNIFIED INPUT/OUTPUT MEMORY MANAGEMENT UNIT

(75) Inventor: Hyunsun Ahn, Seoul (KR)

(73) Assignee: SAMSUNG ELECTRONICS CO., LTD., Suwon-si, Gyeonggi-do (KR)

(*) Notice: Subject to any disclaimer, the term of this patent is extended or adjusted under 35 U.S.C. 154(b) by 284 days.

(21) Appl. No.: 13/095,385

(22) Filed: Apr. 27, 2011

(65) Prior Publication Data

US 2011/0271075 A1    Nov. 3, 2011

(30) Foreign Application Priority Data

Apr. 28, 2010  (KR) .................. 10-2010-0039616

(51) Int. Cl.
 *G06F 12/00* (2006.01)
 *G06F 12/10* (2016.01)

(52) U.S. Cl.
 CPC ............ *G06F 12/1081* (2013.01); *G06F 12/10* (2013.01); *Y02B 60/1225* (2013.01)

(58) Field of Classification Search
 CPC ..... G06F 3/0608; G06F 3/061; G06F 3/0647; G06F 3/0673
 See application file for complete search history.

(56) References Cited

U.S. PATENT DOCUMENTS

| | | | | |
|---|---|---|---|---|
| 7,185,171 B2* | 2/2007 | Fukuoka | ............. | G06F 12/1027 711/206 |
| 7,234,038 B1* | 6/2007 | Durrant | ......................... | 711/203 |
| 7,346,742 B2* | 3/2008 | Day | ...................... | G06F 12/10 711/138 |
| 7,562,205 B1* | 7/2009 | Case | .................... | G06F 12/1036 710/26 |
| 7,934,046 B2* | 4/2011 | Butter | ................. | G06F 13/4031 710/110 |
| 8,117,420 B2* | 2/2012 | Shen | ................... | G06F 12/1027 711/100 |
| 8,205,064 B2* | 6/2012 | Vivenzio | ............. | G06F 12/1027 710/107 |
| 8,225,069 B2* | 7/2012 | Fang | ................... | G06F 12/0292 711/202 |
| 8,275,598 B2* | 9/2012 | Andreev | ............. | G06F 11/3668 703/13 |
| 8,769,213 B2* | 7/2014 | Skinner | ................... | G06F 13/16 711/147 |
| 2004/0193833 A1* | 9/2004 | Hampton | ............ | G06F 12/1072 711/206 |
| 2006/0107022 A1* | 5/2006 | Day | ...................... | G06F 12/10 711/206 |
| 2007/0226450 A1* | 9/2007 | Engbersen | .......... | G06F 12/1483 711/203 |
| 2012/0284486 A1* | 11/2012 | Fang | ................... | G06F 12/0292 711/206 |

FOREIGN PATENT DOCUMENTS

| KR | 102-006-0080380 A | 7/2006 |
|---|---|---|
| KR | 10-2006-0112349 A | 11/2006 |
| KR | 10-2007-0063124 A | 6/2007 |

\* cited by examiner

*Primary Examiner* — Tuan Thai
*Assistant Examiner* — Mohamed Gebril
(74) *Attorney, Agent, or Firm* — Lee & Morse, P.C.

(57) ABSTRACT

A system on chip, includes a memory, a bus, a plurality of intellectual property (IP) blocks, and a unified input/output memory management unit (IOMMU) connected between the memory and the bus and configured to determine whether to perform address conversion for a transaction transferred from the bus based on transaction information.

21 Claims, 5 Drawing Sheets

Fig. 4

| IP | IP_ID | | | | |
|---|---|---|---|---|---|
| | 1st Bit | 2nd Bit | 3rd Bit | 4th Bit | 5th Bit |
| IP_1 | 1 | 0 | 1 | 0 | 0 |
| IP_2 | 1 | 0 | 0 | 1 | 0 |
| IP_3 | 1 | 0 | 0 | 0 | 1 |
| IP_4 | 0 | 1 | 1 | 0 | 0 |
| IP_5 | 0 | 1 | 0 | 1 | 0 |
| IP_6 | 0 | 1 | 0 | 0 | 1 |

SYSTEM ON CHIP INCLUDING UNIFIED INPUT/OUTPUT MEMORY MANAGEMENT UNIT

This application claims priority under 35 U.S.C. §119 to Korean Patent Application No. 10-2010-0039616, filed on Apr. 28, 2010, in the Korean Intellectual Property Office, and entitled: "System on Chip Including Unified Input/Output Memory Management Unit," which is incorporated by reference herein in its entirety.

BACKGROUND

1. Field

Exemplary embodiments relate to System on Chip (SoC), and more particularly, relate to SoC including an Input/Output Memory Management Unit (IOMMU).

2. Description of the Related Art

System-on-a-chip or system on chip (SoC or SOC) refers to integrating all components of a computer or other electronic system into a single integrated circuit (chip). With convergence of computers, communications, broadcasting, etc., demands for ASIC and ASSP are shifted into the SoC. Further, small-sized and light IT equipments accelerate SoC-associated industries.

The SoC may include a plurality of Intellectual Properties (IPs), each of which performs a specific function therein. In general, the intellectual properties are interconnected through a bus. The Advanced Microcontroller Bus Architecture (AMBA) of the ARM Company is applied as an exemplary bus standard for interconnecting and managing IPs within the SoC. The AMBA may include Advanced High-Performance Bus (AHB), Advanced Peripheral Bus (APB), Advanced eXtensible Interface (AXI), and the like. The interface protocol between the AXI and IPs may include a multiple outstanding address function, a data interleaving function, etc.

With the multiple outstanding address function, when information is provided through address and data lines in a bus, an address for a next data transfer can be sent prior to completion of a data transfer. With the data interleaving function, data mixing is supported at an input stage upon a data transfer between intellectual properties. Accordingly, it is possible to efficiently use the bus bandwidth and it is profitable to the latency side.

SUMMARY

One or more embodiments may provide a system on chip, including a memory, a bus, a plurality of intellectual property (IP) blocks, each configured to generate a transaction with a field value, the field value being used to distinguish a virtual address and a physical address, and a unified input/output memory management unit (IOMMU) connected between the memory and the bus and configured to determine whether to perform address conversion for a transaction transferred from the bus based on the field value of the transferred transaction.

The controller may be configured to generate an address translation signal for setting the field value.

The field value may be set to a value indicating that an address of the transaction is a physical address, as a default value.

The field value may be set to a value indicating that an address of the transaction is a virtual address, based on the address translation signal.

The unified IOMMU may be configured to convert an address of the transaction into a physical address when the field value is set to a value indicating that an address of the transaction is a virtual address.

The unified IOMMU may bypass the transaction when the field value is set to a value indicating that an address of the transaction is a physical address.

The unified IOMMU may judge whether address conversion is needed with respect to a next transaction during address conversion of the transaction currently underway.

When the field value is set to a value indicating that an address of the next transaction is a physical address, the unified IOMMU bypasses the next transaction during address conversion of the transaction.

The bus may use an advanced extensible interface (AXI) interface.

One or more embodiments may provide a system on chip, including a memory, a bus, a plurality of IP blocks each generating a transaction to be transferred to the bus, a unified input/output memory management unit (IOMMU) connected between the memory and the bus and configured to perform address conversion for the transaction provided from the bus, and a controller configured to provide the unified IOMMU with transaction state information indicating whether an address of the transaction is a virtual address or a physical address, wherein the transaction includes an intellectual property identification (IP ID) field value for discriminating the plurality of IP blocks.

The unified IOMMU may be configured to determine whether or not of address conversion with respect to the transaction, depending on transaction state information corresponding to the IP ID field value.

The unified IOMMU may be configured to convert the address of the transaction into a corresponding physical address when the address of the transaction is judged to be a virtual address.

The unified IOMMU may be configured to bypass the transaction when the address of the transaction is judged to be a physical address.

The IP ID field value may be defined by topology between the plurality of IP blocks and the bus.

The unified IOMMU may include a translation look-aside buffer that stores an address translation table.

The unified IOMMU may be configured to convert an address based on the address translation table.

The unified IOMMU may be configured to read the address translation table from the memory and then convert an address for the transaction.

One or more embodiments may provide a transaction managing method of a system on chip which includes a memory and a plurality of intellectual properties (IPs), the method including providing one memory management unit at an input level of the memory, receiving a transaction output from one of the IPs, judging whether the transaction includes an address conversion process, when the transaction is judged to not include an address conversion process, bypassing the transaction to the memory through the one memory management unit, and when the transaction is judged to include an address conversion process, converting an address of the transaction through the one memory management unit.

The address conversion process may include converting an address of the transaction into a physical address.

Whether a transaction from one of the plurality of intellectual properties accompanies an address conversion process, is judged according to a field value of the transaction indicating whether an address is a virtual address or a physical address.

One or more embodiments may provide a system on chip, including a memory, a bus, a plurality of intellectual property (IP) blocks, and a unified input/output memory management unit (IOMMU) connected between the memory and the bus, the IOMMU being configured to determine whether to perform an address conversion for a transaction transferred from the bus based on transaction information.

Each of IP blocks may be associated with a unique intellectual property identification (IP ID) field value, and the system further includes a controller configured to provide the transaction information to the IOMMU, the transaction information identifying whether a corresponding address of the transaction is a virtual address or a physical address associated with the respective IP block, as identified by the corresponding IP ID field value.

Each of the IP blocks may be configured to generate the transaction information for each transaction as a field value, the field value being used to distinguish a virtual address and a physical address, and the IOMMU being configured to determine whether to perform address conversion for a transaction transferred from the bus based on the field value of the transferred transaction.

The IOMMU may be configured to convert a virtual address to a corresponding physical address when address conversion is to be performed for the respective transaction.

BRIEF DESCRIPTION OF THE DRAWINGS

Features and advantages will become more apparent to those of ordinary skill in the art by describing in detail exemplary embodiments with reference to the attached drawings, in which:

FIG. 4 illustrates a table of exemplary IP ID field values employable by the system on chip illustrated in FIG. 3.

DETAILED DESCRIPTION

Figure 1:
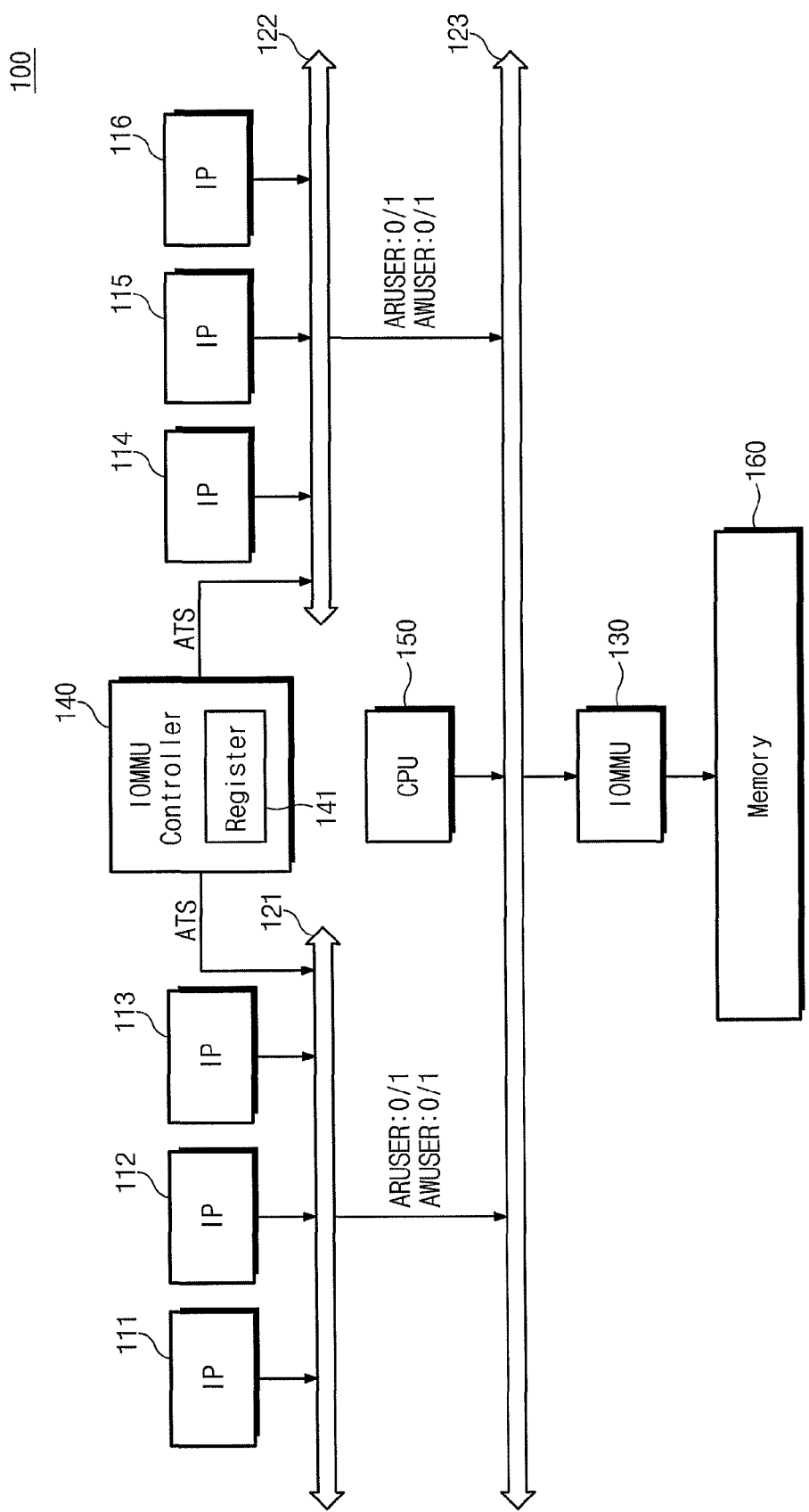
FIG. 1 illustrates a block diagram of an exemplary embodiment of a system on chip.

The inventive concept is described more fully hereinafter with reference to the accompanying drawings, in which exemplary embodiments of the inventive concept are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of blocks or regions may be exaggerated for clarity. Like numbers refer to like elements throughout the specification.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "between" and the like, may be used herein for ease of description to describe one element or feature's relationship to another element(s) or feature(s) as illustrated in the figures. It is understood that, unless specified otherwise, the element may be the only element between the two elements, or one or more intervening elements may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

A system on chip (referred to as SoC) may include a unified input/output memory management unit (IOMMU) at a memory level. The unified IOMMU may be realized by unifying input/output memory management units which are placed at intellectual property blocks, respectively. This makes it possible to reduce duplication of logics used for a virtual-to-physical address conversion.

In one or more embodiments, since the unified IOMMU is placed at a memory level, virtual and physical addresses may be used together as addresses of transactions on a bus. Accordingly, the unified IOMMU may convert a transaction address into a physical address only when the transaction address is a virtual address. The unified IOMMU may bypass the transaction address without address conversion when the transaction address is a physical address.

FIG. 1 illustrates a block diagram of an exemplary embodiment of a system on chip 100. Referring to FIG. 1, the SoC 100 may include first to sixth blocks 111 to 116, e.g., intellectual property (IP) blocks, first and second local buses 121 and 122, a system bus 123, a unified IOMMU 130, and an IOMMU controller 140, CPU 150, and a memory 160.

The first to third IP blocks 111 to 113 may transfer a transaction to the unified IOMMU 130 through the first local bus 121 and the system bus 123. The fourth to sixth IP blocks 114 to 116 may transfer a transaction to the unified IOMMU 130 through the second local bus 122 and the system bus 123.

Herein, it is assumed that the interface protocol applied to the buses 122 to 123 is the Advanced eXtensible Interface (AXI). With the AXI, the SoC 100 may support a multiple outstanding address function and a data interleaving function. In particular, with the multiple outstanding address function, when a transaction for address information (hereinafter, referred to as an address transaction) and a transaction for data information (hereinafter, referred to as a data transaction) are provided, an address transaction for transferring a next data transaction may be sent before a transfer of the data transaction is completed.

A transaction sent from each of the IP blocks 111 to 116 may include a field value indicating whether an address is a virtual address or a physical address. A title of a field value for distinguishing virtual and physical addresses may be based on a transaction type. For example, a field value "AWUSER" may be included in a transaction for write address information (hereinafter, called a write address transaction). A field value "ARUSER" may be included in a transaction for read address information (hereinafter, called a read address transaction).

The field values AWUSER, ARUSER may be set to '0' as a default value. In one or more embodiments, the field values AWUSER, ARUSER may be set to '0' when an address of a transaction is a physical address. The field values AWUSER, ARUSER may be set to '1' when an address of a transaction is a virtual address.

The unified IOMMU 130 may convert a virtual address used by the first to sixth IP blocks 111 to 116 into a physical address. That is, the unified IOMMU 130 may map fragmented physical memory regions to a continuous virtual address. In such embodiments, although physical memory regions are not assigned to a continuous physical address, it is possible to use a memory space efficiently. In one or more embodiments, e.g., a wider memory space may be assigned to each of the IP blocks. The virtual address may be called a device address or an input/output address.

Transactions of the first to third IP blocks 111 to 113 may be sent to the unified IOMMU 130 through the first local bus 121 and the system bus 123, and transactions of the fourth to sixth IP blocks 114 to 116 may be sent to the unified IOMMU 130 through the second local bus 122 and the system bus 123. The unified IOMMU 130 may perform address conversion with respect to transactions transferred through the buses 121 to 123 of the SoC 100. This means that virtual and physical addresses are mixed as addresses of transactions on the buses 121 to 123.

In one or more embodiments, the unified IOMMU 130 may determine address conversion according to the AWUSER or ARUSER. The unified IOMMU 130 may convert an address of a transaction into a physical address when the AWUSER or ARUSER indicates a virtual address, e.g., is set to 1. A transaction including such an address conversion may be sent to the memory 160. The unified IOMMU 130 may bypass a transaction when the AWUSER or ARUSER indicates a physical address, e.g., is set to 0.

The unified IOMMU 130 may refer to an address translation table to convert addresses. The address translation table may be stored in a translation look-aside buffer (TLB). Embodiments are not limited thereto. For example, if the address translation table is not loaded in the TLB, address conversion may be made after reading the address translation table from the memory 160.

The unified IOMMU 130 may judge address conversion of a next transaction during address conversion. If the AWUSER or ARUSER for a next transaction indicates a physical address, e.g., is set to '0', the unified IOMMU 130 may bypass a next transaction even at a stage of address conversion for a previous transaction.

The IOMMU controller 140 may generates an address translation signal ATS for setting the AWUSER or ARUSER for a transaction, depending upon whether an address of a transaction sent from each of the IP blocks 111 to 116 is a virtual address or a physical address. For example, the AWUSER or ARUSER may be set to '1' from '0' in response to the address translation signal ATS. As described above, in one or more embodiments, the AWUSER or ARUSER may be set to '0' as a default value, and the IOMMU controller 140 may generate the address translation signal ATS only in a case where a transaction address is a virtual or logical address.

The IOMMU controller 140 may include a register 141 for storing transaction state information which indicates whether addresses of transactions from the respective IP blocks 111 to 116 are a virtual address or a physical address. Transaction state information for each IP block may be provided from the CPU 150. Accordingly, the IOMMU controller 140 may determine generation of the address translation signal ATS based upon transaction state information in the register 141.

The CPU 150 may be connected with the system bus 123 and may control an overall operation of the SoC 100. Although not illustrated in figures, the CPU 150 may include well-known elements, such as registers, a memory management unit (MMU), and the like. Herein, the CPU 150 is based on an ARM core.

The memory 160 may store data processed at the SoC 100. The memory 160 may include a volatile memory such as SRAM, DRAM, SDRAM, or the like. Alternatively, the memory 160 may include a non-volatile memory device such as ROM, PROM, EPROM, EEPROM, a flash memory, PRAM, MRAM, FRAM, RRAM, or the like.

Each region of the memory 160 may be assigned by a physical address. Accordingly, in a case where IP blocks using a virtual address access the memory 160, addresses of IP blocks must be converted into physical addresses. A virtual employed by the CPU 150 may be converted by a memory management unit (MMU) of the CPU 150. On the other hand, a virtual address used at each of the first to sixth IP blocks 111 to 116 may be converted by the unified IOMMU 130.

Figure 2:
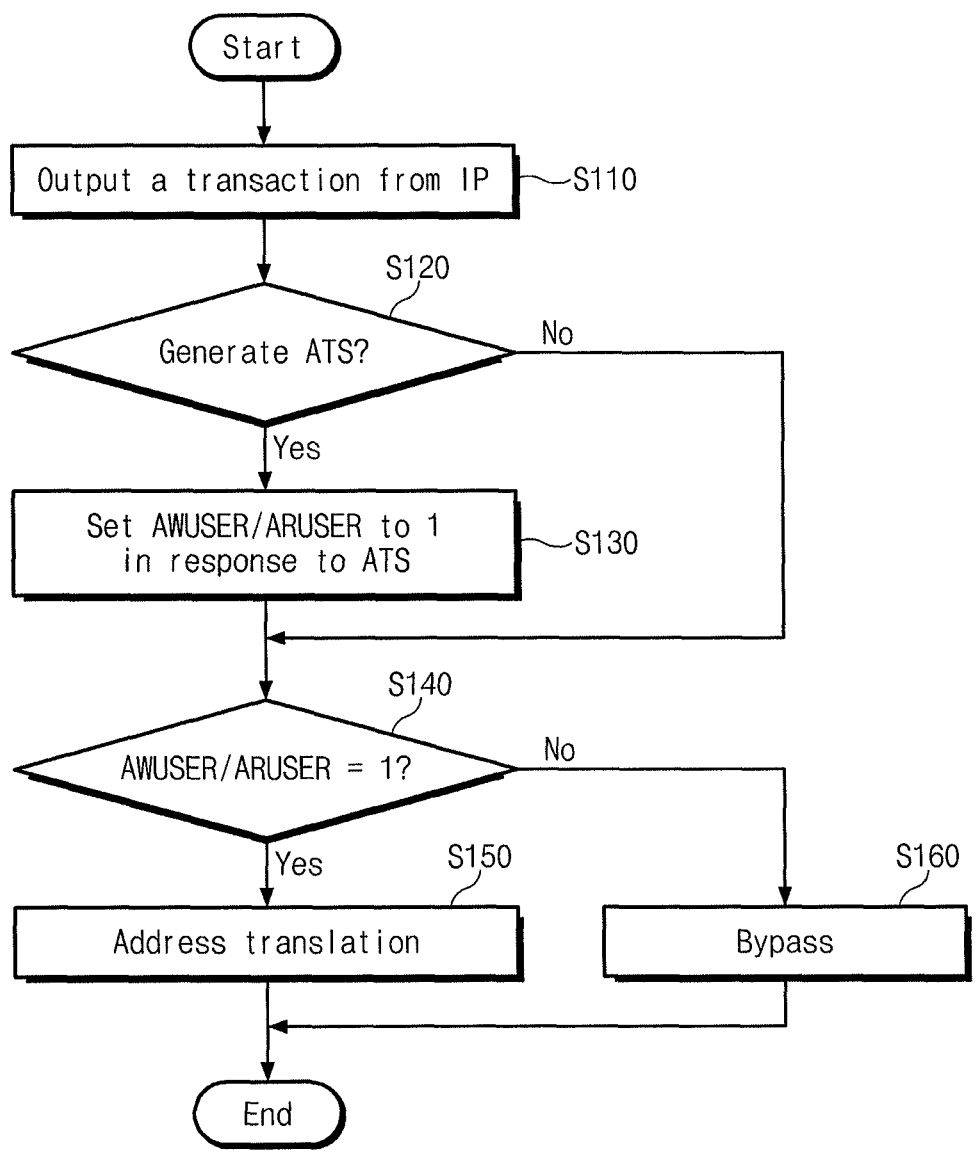
FIG. 2 illustrates a flow chart of an exemplary embodiment of an operation of the system on chip illustrated in FIG. 1.

FIG. 2 illustrates a flow chart of an exemplary embodiment of an operation of the system on chip 100 illustrated in FIG. 1.

Referring to FIG. 2, a transaction may be output from an IP block (S110). An IOMMU controller 140 (refer to FIG. 1) may then determine whether to generate of an address translation signal ATS, depending upon whether a transaction address is a virtual address or a physical address (S120). If the transaction address is a virtual address (S120=Yes), the IOMMU controller 140 may generate the address translation signal ATS. If the transaction address is a physical address (S120=No), the IOMMU controller 140 may not generate the address translation signal ATS (may skip S130 and proceed to S140).

As described above, in one or more embodiments, e.g., the AWUSER or ARUSER may be set to '0' as a default value. The AWUSER or ARUSER within a transaction may be set to '1' according to the address translation signal ATS. More particularly, in such embodiments, if the address translation signal ATS is not generated (e.g., skipped S130), the AWUSER or ARUSER may retain a default value of, e.g., "0."

A transaction may then be transferred to a unified IOMMU 130 (refer to FIG. 1) through local and system buses (121, 122, and/or 123). The unified IOMMU 130 may judge whether the AWUSER or ARUSER is set to '1' or '0' (S150). If the AWUSER or ARUSER is set to '1' (S150=Yes), a transaction address may be converted to a physical address from a virtual address. If the AWUSER or ARUSER is set to '0' (S150=No) a transaction bypass may occur (S160).

One or more embodiments of a SoC including one or more features described herein may reduce duplication of logic blocks used for address conversion by realizing a unified IOMMU at the memory level. One or more embodiments of a SoC including one or more features described herein may reduce design complexity and power consumption relative to comparable conventional SoCs.

In one or more embodiments, by employing a unified IOMMU at a memory level, virtual and physical addresses may be mixed as addresses of transactions on a bus. More particularly, e.g., AWUSER or ARUSER defined by the AXI protocol may be used as information indicating whether a transaction address is a virtual address or a physical address. The IOMMU controller may generate an address translation signal for setting the AWUSER or ARUSER in a transaction, depending upon whether a transaction address is a virtual address or a physical address. The unified IOMMU may determine whether or not address conversion should be performed based on the AWUSER or ARUSER.

Figure 3:
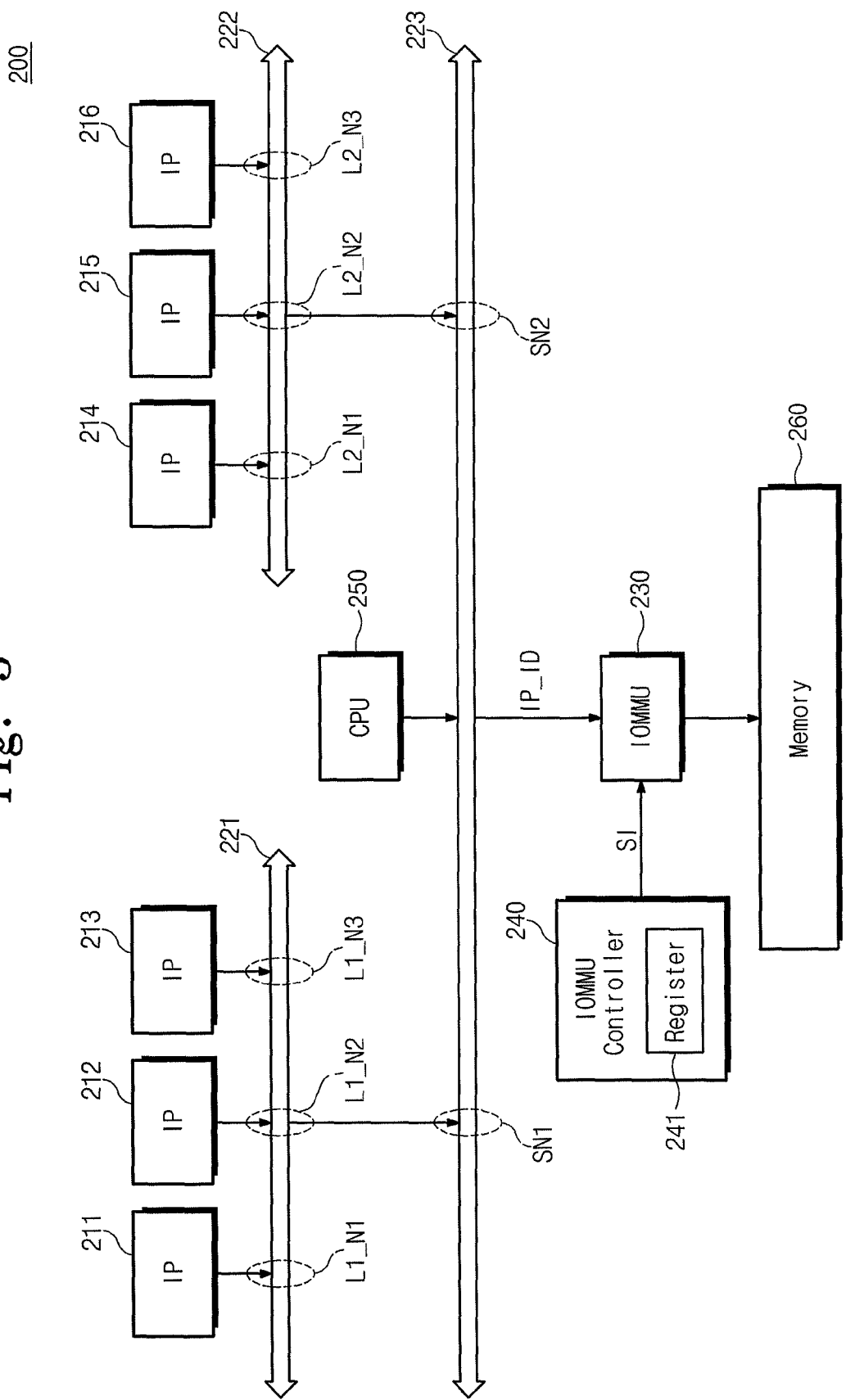
FIG. 3 illustrates a block diagram of another exemplary embodiment of a system on chip.

FIG. 3 illustrates a block diagram of another exemplary embodiment of a system on chip 200.

Referring to FIG. 3, the SoC 200 according to the second embodiment of the inventive concept includes the first to sixth IP blocks 211 to 216, the first and second local buses 221 and 222, a system bus 223, a unified IOMMU 230, an IOMMU controller 240, CPU 250, and a memory 260. In general, only differences between the exemplary SoC 200 of FIG. 3 and the exemplary SoC 100 of FIG. 1 will be described below.

The first to third IP blocks 211 to 213 may transfer their transactions to the unified IOMMU 230 through the first local bus 221 and the system bus 223. The fourth to sixth IP blocks 214 to 216 may transfer their transactions to the unified IOMMU 230 through the second local bus 222 and the system bus 223. The CPU 250 may correspond to the memory 250 of FIG. 1.

The unified IOMMU 230 may convert a virtual address, which may be used at the first to sixth IP blocks 211 to 216, into a physical address. That is, the unified IOMMU 230 may perform address translation with respect to transactions sent through the buses 221 to 223 of the SoC 200. In one or more embodiments, virtual and physical addresses may be mixed as addresses of transactions on the buses 221 to 223.

The unified IOMMU 230 may determine whether or not of address conversion is to occur for the respective transaction. More particularly, based on an IP ID field value IP_ID in a transaction and transaction state information SI provided from the IOMMU controller 240, the unified IOMMU 230 may determine whether an address conversion is to occur for the respective transaction.

FIG. 4 illustrates a table of exemplary IP ID field values employable by the SoC 200 illustrated in FIG. 3. Referring to FIGS. 3 and 4, an IP ID field value IP_ID may have a different value to distinguish the first to sixth IP blocks 211 to 216. That is, it is possible to judge whether transactions are transferred from an IP, based upon the IP ID field value IP_ID. The IP ID field value IP_ID may be defined by the AXI protocol.

Further, the IP ID field value IP_ID may be defined by the topology between the IP blocks 211 to 216 and the buses 221 to 223. For example, the first and second bits of the IP ID field value IP_ID may be defined by the topology for the system bus 223. A first bit of the IP ID field value IP_ID may be set to '1' in order to indicate an IP block transferring transactions via a first node SN1 of the system bus 223. A second bit of the IP ID field value IP_ID may be set to '1' in order to indicate an IP block transferring transactions via a second node SN2 of the system bus 223.

The third to fifth bits of the IP ID field value IP_ID may be defined by the topology for the local buses 221 and 222. The third bit of the IP ID field value IP_ID may be set to '1' in order to indicate an IP block transferring transactions via the first node L1_N1 of the first local bus 221. The fourth bit of the IP ID field value IP_ID may be set to '1' in order to indicate an IP block transferring transactions via the second node L1_N2 of the first local bus 221. The fifth bit of the IP ID field value IP_ID may be set to '1' in order to indicate an IP block transferring transactions via the third node L1_N3 of the first local bus 221.

As described above, in one or more embodiments, the third bit of the IP ID field value IP_ID may be set to '1' in order to indicate an IP block transferring transactions via the first node L2_N1 of the second local bus 222. The fourth bit of the IP ID field value IP_ID may be set to '1' in order to indicate an IP block transferring transactions via the second node L2_N2 of the second local bus 222. The fifth bit of the IP ID field value IP_ID may be set to '1' in order to indicate an IP block transferring transactions via the third node L2_N3 of the second local bus 222.

Returning to FIG. 3, in one or more embodiments, the unified IOMMU 230 may judge whether a corresponding transaction address is a virtual address or a physical address, based upon transaction state information SI corresponding to the IP ID field value IP_ID in a sent transaction. The unified IOMMU 230 may perform address conversion when a transaction address is a virtual address. The unified IOMMU 230 may bypass a transaction when a transaction address is a physical address.

The unified IOMMU 130 may refer to an address translation table to convert addresses. The address translation table may be stored in a translation look-aside buffer (TLB). If the address translation table is not loaded in the TLB, address conversion may be made after reading the address translation table from the memory 160.

The IOMMU controller 240 may include a register 241 for storing transaction state information SI that indicates whether transaction addresses from IP blocks 211 to 216 are a virtual address or a physical address. The transaction state information SI for each IP block may be provided from the CPU 250. The IOMMU controller 240 may provide the unified IOMMU 230 with transaction state information SI corresponding to the IP ID field value IP_ID.

Figure 5:
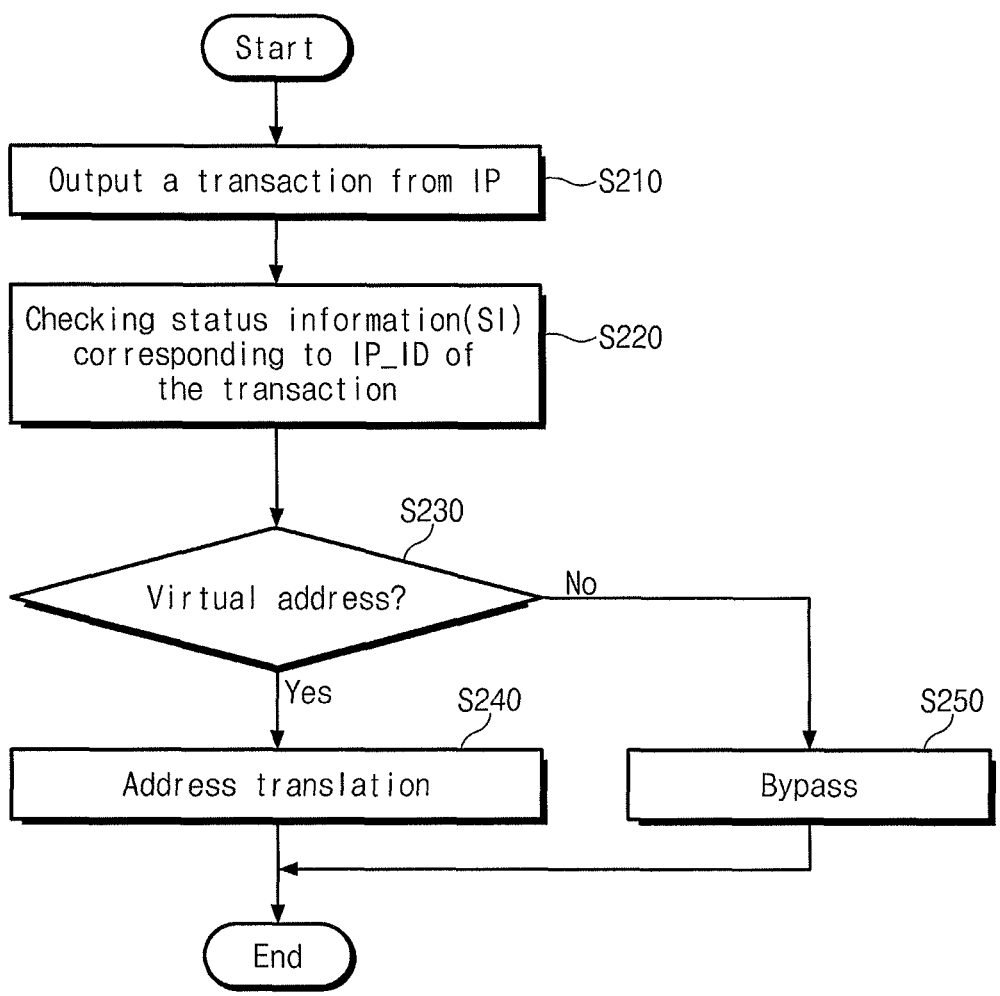
FIG. 5 illustrates a flow chart of an exemplary embodiment of an operation of the system on chip illustrated in FIG. 3.

FIG. 5 illustrates a flow chart of an exemplary embodiment of an operation of the system on chip 200 illustrated in FIG. 3.

Referring to FIGS. 3 and 5, a transaction may be output from an IP block (S210). A unified IOMMU 230 may confirm transaction state information SI corresponding to an IP ID field value IP_ID in the transaction (S220). The transaction state information SI may be provided from an IOMMU controller 240.

The unified IOMMU 230 may judge whether an address of a corresponding transaction is a virtual address or a physical address (S230), depending upon the transaction state information SI. If the transaction address is a virtual address (S230=Yes), the unified IOMMU 230 may translate the address (S240). If the transaction address is determined to be a physical address (S230=No), the unified IOMMU 230 may bypass the transaction (S250).

One or more embodiments of a SoC employing one or more aspects described above may reduce duplication of logic devices and/or block used for address conversion by realizing a unified IOMMU at a memory level. One or more embodiments may of a SoC employing one or more aspects described above may enable design complexity and/or power consumption to be reduced relative to comparable conventional SoCs.

In one or more embodiments, by employing a unified IOMMU at the memory level, virtual and physical addresses may be mixed as addresses of transactions on a bus. The unified IOMMU may determine whether address conversion is needed based on an IP ID field value IP_ID and/or transaction state information corresponding thereto.

The above-disclosed subject matter is to be considered illustrative, and not restrictive, and the appended claims are intended to cover all such modifications, enhancements, and other embodiments, which fall within the true spirit and scope. Thus, to the maximum extent allowed by law, the scope is to be determined by the broadest permissible interpretation of the following claims and their equivalents, and shall not be restricted or limited by the foregoing detailed description.

What is claimed is:

1. A system on chip, comprising:
a central process unit (CPU) to control an overall operation of the system on chip;
a memory;
a bus including a first bus and a second bus;
a plurality of intellectual property (IP) blocks connected to the first and second buses, each of the IP blocks to generate a transaction including an intellectual property identification (IP ID) field value and a field value, the IP ID field value indicating whether the transaction from each of IP blocks is transferred through the first bus or through the second bus, the field value being used to distinguish a virtual address and a physical address and being different from the virtual address and physical address;
a unified input/output memory management unit (IOMMU) connected between the memory and the bus and to determine whether to perform address conversion for a transaction transferred from each of the IP blocks through the first bus or through the second bus based on the field value of the transferred transaction; and
a controller to generate an address translation signal for setting the field value of the transaction according to transaction state information of each of the IP blocks, the transaction state information that is provided from the CPU to the controller, wherein
the transaction state information indicates whether an address of the transaction is a virtual address or a physical address.

2. The system on chip as claimed in claim 1, wherein the field value of the transaction is set to a value indicating that an address of the transaction is a physical address, as a default value.

3. The system on chip as claimed in claim 1, wherein the field value of the transaction is set to a value indicating that an address of the transaction is a virtual address, based on the address translation signal.

4. The system on chip as claimed in claim 1, wherein the unified IOMMU is to convert an address of the transferred transaction into a physical address when the field value of the transferred transaction is set to a value indicating that an address of the transaction is a virtual address.

5. The system on chip as claimed in claim 1, wherein the unified IOMMU is to bypass the transferred transaction when the field value of the transferred transaction is set to a value indicating that an address of the transferred transaction is a physical address.

6. The system on chip as claimed in claim 1, wherein the unified IOMMU is to judge whether address conversion is needed with respect to a next transaction during address conversion of a current transaction underway.

7. The system on chip as claimed in claim 6, wherein when the field value of the next transaction is set to a value indicating that an address of the next transaction is a physical address, the unified IOMMU bypasses the next transaction during address conversion of the current transaction.

8. The system on chip as claimed in claim 1, wherein the bus uses an advanced extensible interface (AXI) interface.

9. A system on chip, comprising:
a central process unit (CPU) to control an overall operation of the system on chip;
a memory;
a bus including a first bus and a second bus;
a plurality of IP blocks connected to the first and second buses, each of the IP blocks to generate a transaction to be transferred to the first bus or the second bus;
a unified input/output memory management unit (IOMMU) connected between the memory and the bus and to manage the transaction provided from the first bus or the second bus; and
a controller to provide the unified IOMMU with transaction state information indicating whether an address of the transaction is a virtual address or a physical address, wherein:
the transaction includes an intellectual property identification (IP ID) field value for discriminating the plurality of IP blocks, the IP ID field value indicating whether the transaction from each of IP blocks is transferred through the first bus or through the second bus and
the transaction state information is different from the virtual address and physical address, is provided from the CPU, and is stored in the controller.

10. The system on chip as claimed in claim 9, wherein the unified IOMMU is to determine whether to perform address conversion with respect to the transaction, depending on transaction state information corresponding to the IP ID field value.

11. The system on chip as claimed in claim 10, wherein when the address of the transaction is judged to be a virtual address, the unified IOMMU is to convert the address of the transaction into a corresponding physical address.

12. The system on chip as claimed in claim 10, wherein when the address of the transaction is judged to be a physical address, the unified IOMMU is to bypass the transaction.

13. The system on chip as claimed in claim 10, wherein the IP ID field value is defined by topology between the plurality of IP blocks and the bus.

14. The system on chip as claimed in claim 10, wherein the unified IOMMU includes a translation look-aside buffer that stores an address translation table.

15. The system on chip as claimed in claim 14, wherein the unified IOMMU is to convert an address based on the address translation table.

16. The system on chip as claimed in claim 14, wherein the unified IOMMU is to read the address translation table from the memory and then convert an address for the transaction.

17. A transaction managing method of a system on chip which includes a central process unit (CPU) to control an overall operation of the system on chip, a memory and a plurality of intellectual properties (IPs), the method comprising:
providing one memory management unit at an input level of the memory;
receiving a transaction output from one of the IPs through a bus including a first bus and a second bus, the first and second buses connected to the IPs, wherein
the transaction includes an intellectual property identification (IP ID) field value, the IP ID field value indicating whether the transaction from the one of IP blocks is transferred through the first bus or through the second bus, and including a field value indicating whether an address of the transaction is a virtual address or a physical address;
providing the one memory management unit with the field value;
judging whether an address conversion is to be performed based on the field value included with the transaction, the field value being different from an address;

when the transaction is judged to not include an address conversion process based on a first value of the field value, bypassing the transaction to the memory through the one memory management unit; and when the transaction is judged to include an address conversion process based on a second value of the field value, converting an address of the transaction through the one memory management unit, wherein the field value included with the transaction is determined according to transaction state information of the one of the IPs, and wherein the transaction state information is provided from the CPU and indicates whether an address of the transaction is a virtual address or a physical address.

18. The transaction managing method as claimed in claim 17, wherein the address conversion process includes converting an address of the transaction into a physical address.

19. The transaction managing method as claimed in claim 17, wherein:

the first value of the field value indicates that the address of the transaction is a physical address, and the second value of the field value indicates that the address of the transaction is a virtual address.

20. The system on chip as claimed in claim 1, wherein a memory access of the plurality of IP blocks is managed by the unified IOMMU, and a memory access of the CPU is managed by a memory management unit (MMU) that is included in the CPU.

21. The system on chip as claimed in claim 1, wherein the IP ID field value of the transaction from each of the IP blocks indicates whether each of the IP blocks is connected to the first bus or the second bus.

* * * * *